Patented June 15, 1954

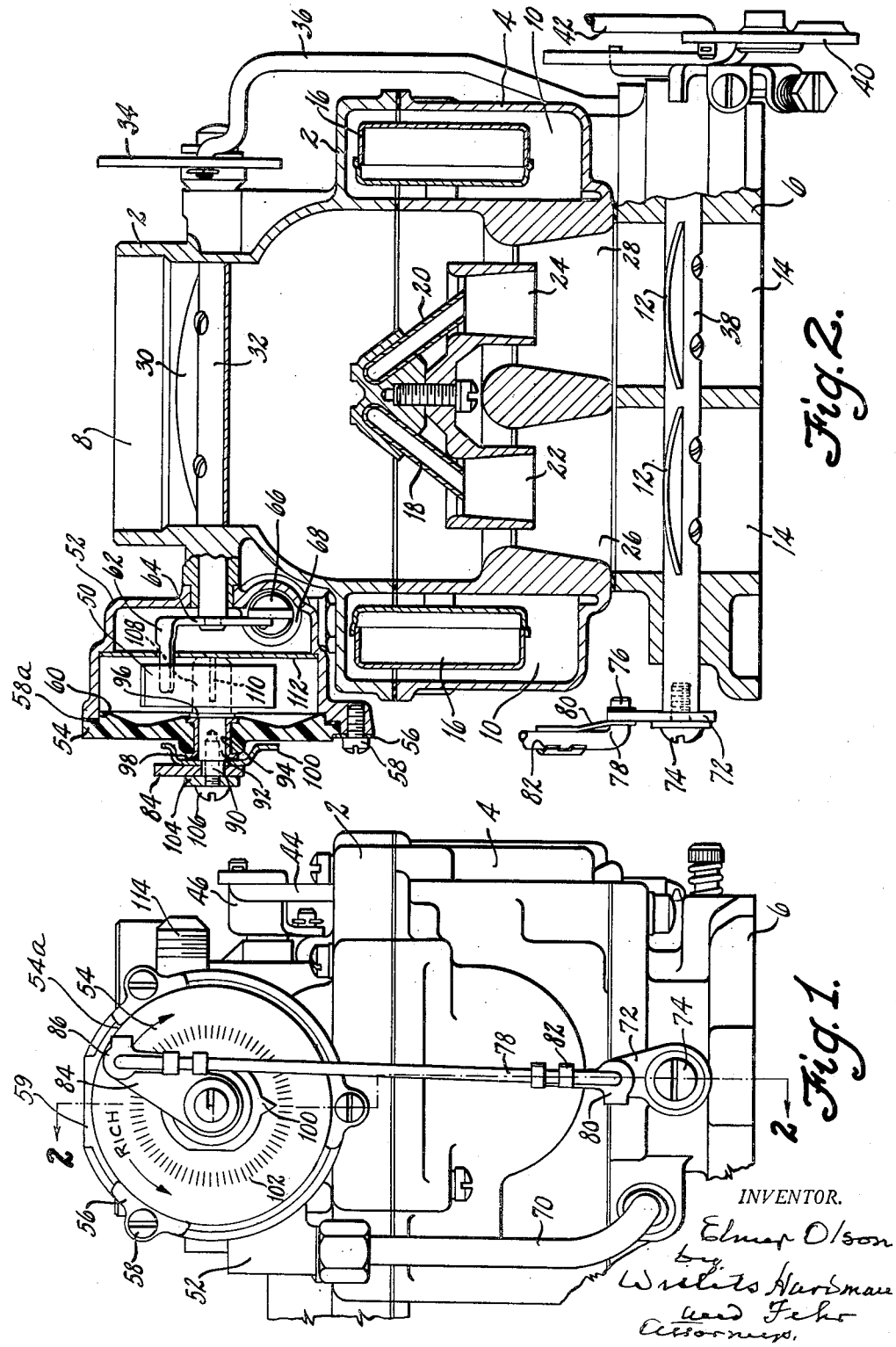

2,681,215

UNITED STATES PATENT OFFICE 2,681,215

AUTOMATIC CHOKE DEVICE FOR CARBURETORS

Elmer Olson, Rochester, N. Y., assignor to General Motors Corporation, Detroit, Mich., a corporation of Delaware Application July 7, 1951, Serial No. 235,591

6 Claims. (Cl. 261—39)

This invention relates to carburetors for internal combustion engines and more particularly to mechanism for automatically controlling the position of the air inlet or choke valve in response to variations in temperature, engine suction and throttle position for the purpose of facilitating starting and effecting satisfactory operation of the engine before normal operating temperature is reached.

With automatic choke devices such as are generally used commercially, it is the practice to initially set the thermostat, which is effective to control the position of the choke valve in response to temperature variations, in such a position that it holds the choke valve closed without exerting any appreciable pressure thereon at some given temperature, generally 70° to 75° F. It is also sometimes desirable to change this initial setting upon changes in climatic conditions, for example, to set the thermostat initially in cold weather so that a somewhat richer mixture will be provided than in warm weather. It is likewise true that in some installations the initial setting of the thermostat should be such as to produce a slightly richer or slightly leaner mixture than would be produced by the standard initial setting.

In view of these facts, it is the general custom to visibly indicate on an element movable with the thermostat, some standard initial setting of the thermostat and then, if desirable, to move said element from this standard setting in one direction or the other the amount required to give the best results. For example, when the carburetor is assembled and the thermostat is set in a position where it will hold the choke valve closed in the manner set forth at a temperature of 75°, an indicating mark on an element movable with the thermostat is in alignment with what might be termed the zero mark of a scale on the housing relative to which said element is movable to obtain a richer or leaner mixture, the movable element can be moved in one direction or the other from the standard setting.

The scale above referred to is usually formed on the carburetor casting adjacent the open end of a cup shaped housing on which is placed the index mark which indicates a standard thermostat setting. The housing is adjustably secured to the casting and receives the thermostat, one end of which is connected to a pin which is secured to the closed end of the housing and extends axially therefrom. The other end of the thermostat is arranged to engage an arm extending from the choke valve shaft to hold the valve closed at low temperatures with a pressure which varies inversely with the temperature. Movement of the housing varies the effect of the thermostat for any given temperature.

In the carburetor which is disclosed herein, one end of the choke controlling thermostat is adapted to engage an arm on the choke valve shaft as in the ordinary construction, but the other end of the thermostat is connected to a short shaft which extends through the thermostat housing and is connected to the throttle so as to be moved thereby as the throttle is moved, in order to vary the pressure exerted by the thermostat on the choke valve as the throttle is moved to different positions. Also, the housing, when the carburetor is assembled, is fixed relative to the carburetor casting so that the desired setting of the thermostat cannot be effected in this device in the manner above set forth. It is, therefore, the primary object of this invention to devise a method for visibly indicating a standard initial setting of the choke controlling thermostat in a carburetor of this type and to effect a setting of said thermostat at variance with the initial setting if it be desired to do so. This object is accomplished in the manner hereinafter specifically described.

Further objects and advantages of the present invention will be apparent from the following description, reference being had to the accompanying drawings wherein a preferred embodiment of the present invention is clearly shown.

In the drawings:

Fig. 1 is a partial end elevation of a carburetor provided with an automatic choke device provided with an operating connection between the throttle and the choke controlling thermostat.

Fig. 2 is a vertical section on the line 2—2 of Fig. 1.

Before proceeding with the detailed description of the device disclosed, attention is called to the fact that the present invention is illustrated in a dual carburetor having two mixture outlets controlled by two throttle valves, two mixing chambers and two fuel nozzles. The invention is in no way particularly related to a dual carburetor, but is equally applicable to a single outlet carburetor, also the details of construction of the carburetor are wholly immaterial and are not fully disclosed herein.

As shown, the carburetor is formed of three castings 2, 4, and 6, in which are, respectively, the air inlet 8, the fuel chamber 10 and the throttle valves 12. The throttle body casting 6 is adapted to be connected to the intake manifold of the engine in the usual way and has two outlet passages 14 which are controlled by the two throttle valves 12.

Fuel is supplied to the chamber 10 from some suitable source of supply and a constant level is maintained therein by the usual valve (not shown) operated by a float 16. A fuel passage which is not shown leads from the chamber 10 to two fuel nozzles 18 and 20 which discharge fuel into two primary Venturi tubes 22 and 24 respectively, said primary tubes discharging into secondary tubes 26 and 28 respectively, which are formed in the casting 4 and which connect with the outlet passages 14.

A single air inlet 6 supplies air to be mixed with the fuel flowing from both the nozzles 18 and 20 and admission of air is automatically controlled by a choke valve 30 secured to a shaft 32 rotatably mounted in the casting 2. The position of the choke valve is automatically controlled when the engine is inoperative, or when operating at a lower than normal operating temperature by a mechanism which will be later described and which is controlled in response to variations in temperature and engine suction. An arm 34 on the choke valve shaft 32 is connected by a link 36 to a fast idle mechanism of conventional design which is adapted to prevent closing of the throttle to normal idle position at low temperatures so that at such temperatures the idling operation of the engine is faster than at higher temperatures. This mechanism is of ordinary construction and has no specific relation to the present invention.

The throttles 12 are secured to a shaft 38 to which an operating arm 40 is secured and an operating connection (not shown), extends from this arm to the usual accelerator pedal. A link 42 connects the arm 40 with means for operating the usual accelerator pump, a rod 44 which extends to the pump piston, being connected to a lever 46, as shown in Fig. 1, the lever being operated by the link 42.

The mechanism for automatically controlling the position of the choke valve includes a coiled, bimetallic thermostat 50 which is positioned within a housing 52 secured in any suitable way to the carburetor casting 2 and having a cover plate 54 which can be of plastic material or metal. The plate is cut away at its periphery to form a flange 54a which is engaged by clips 56 through which pass screws 58 threaded in the housing 52 and which are tightened to hold the plate against a suitable gasket 58a. At the top the plate has a projection 59 which fits in a notch in the housing 62 and prevents any rotation of the plate relative to the housing. A flange 60 on the cover plate projects into the housing 52. One end of the thermostat 50 is adapted to engage the bent over portion 62 of an arm 64 which is secured to the left end of shaft 32 as seen in Fig. 2, and moves the arm 64 to a position to hold the choke valve closed at low temperatures.

The opposite end of arm 64 is pivotally connected to a piston 66 slidable in a cylinder 68 to which the suction of the engine is communicated by a pipe 70, which connects at its lower end to a passage leading to one of the intake passages 14 between the throttle and the carburetor outlet and its upper end with a passage leading to the cylinder 68. Neither of these passages is shown as this construction is well known and in common use. When the engine suction which is communicated to cylinder 68 becomes great enough, the piston 66 will be moved against the force of the thermostat to open the valve 30 to an extent determined by the relative force of the thermostat and the suction, the movement of the valve ceasing when these forces are in balance. The piston becomes effective to open the valve to some extent when the engine begins to run under its own power when first started and is effective during the warm-up period to prevent the mixture becoming over-rich.

It has been found that, in some installations, if the throttle is opened after the engine starts to run under its own power and before normal operating temperature is reached the engine suction falls to such an extent that the piston 66 does not exert sufficient force to move the choke valve far enough toward open position and the mixture becomes over-rich in spits of the action of said piston. In the device disclosed herein, means have been provided to prevent this action, such means comprising a connection through which the movement of the throttle toward open position moves the thermostat so as to progressively reduce the pressure exerted thereby to hold the choke valve closed as the throttle moves toward open position.

For this purpose an operating arm 72 is connected to the throttle shaft for movement therewith by a screw 74 which extends through an orifice in the arm and is screwed into the end of the throttle shaft. At its opposite end, this arm has an opening through which the bent-over portion 76 of a link 78 projects. To prevent disengagement of the part 76 from the hole in arm 78 through which it extends, a spring clamp 80 is provided, one end of which is bifurcated so as to engage arm 72 on both sides thereof, as shown in Fig. 2, and is provided with holes which line up with the hole in arm 72 and through which the part 76 also passes when the device is assembled. At its upper end the clamp 80 is provided with extending fingers 82 which are partly bent around the link 78 as shown in the drawings.

At its upper end the link 78 has a bent-over part similar to 76 which is received in a hole in the arm 84 when the device is assembled and a spring clamp 86, similar to the clamp 80, prevents any possible accidental disengagement of link 78 and the arm 84 after the device is assembled.

The arm 84 has a hole in the opposite end which is rotatable on reduced portion 90 of a shaft 92 which is journalled for rotation in a bushing 94 mounted at the center of the cover plate 54 and provided with a flange 96 engaging the right-hand end of the bushing as seen in Fig. 2. Also received on the part 90 between the arm 84 and the shoulder 98 is an indicating pointer 100 which, when the shaft 92 is rotated, moves over a scale 102 on the cover plate 54. The part 90 of shaft 92 is not round, but is somewhat flattened on opposite sides and the opening in the pointer 100 through which the part 90 extends is correspondingly formed so that the pointer 100 will rotate with the shaft 92. When the device is assembled, the arm 84 and the indicating pointer 100 are clamped between the shoulder 98 and a washer 104 that is engaged by a screw 106 which is threaded in the shaft 90 and can be tightened to hold the several parts in fixed position relative to the shaft 90. The contiguous surfaces of the pointer and arm 84 are slightly serrated to facilitate the action of the clamping screw 106.

At its inner end the shaft 90 has an enlarged portion 108 and one end of the thermostat is received in a slot 110 formed in this part of the shaft. When the shaft 90 is rotated, it winds up or unwinds the thermostat, depending on the direction of rotation of said shaft, to either increase or decrease the pressure exerted by said thermostat to hold said choke valve closed. Through the medium of the link 78 and associated parts, the throttle is effective, when the arms 78 and 84 are tightened up by their associated clamping screws, to move the shaft 90 in a direction to decrease the thermostatic pressure opposing opening of the choke valve when the throttle is moved toward open position.

A plate 112 is positioned in the housing 52 to prevent dirt getting into the cylinder 68, while extending from the housing 52 is a tubular extension 114 to which a pipe leading to an exhaust stove or some other suitable source of hot air is adapted to be connected. Part 62 extends through a slot in plate 112.

As already indicated, it is the purpose of the applicant to devise a method by which a standard setting of the thermostat, at which it will hold the choke valve 30 closed with no appreciable pressure at some selected temperature, for example, 75° F., may be visibly indicated in a carburetor having a choke control mechanism such as that disclosed, and by which the thermostat may be set in a position at variance with the standard setting if such a setting be desired. With a choke control of the kind disclosed a standard setting of the thermostat cannot be indicated in the manner previously described because the thermostat is not connected to the plate 54 and movement of the latter does nothing whatever to the thermostat. Accordingly some different method of indicating a standard thermostat setting and adjusting the thermostat with respect to such setting must be employed.

In order to indicate a standard setting of the thermostat in this device, the plate 54, with the shaft 92 and pointer 100 rotatably mounted thereon, is mounted in a suitable fixture for comparison with a master thermostat. The details of construction of this fixture comprise no part of the present invention and its construction is not illustrated. However, a suitable device includes a shaft which moves an indicating pointer past an indicating scale and is so arranged that its movement is opposed by the master thermostat.

The plate 54 is positioned in the fixture and held against rotation, but is so arranged that if the shaft 92 is rotated, the free end of the thermostat 50 can rotate the shaft of the fixture in opposition to the pressure exerted by the master thermostat. When the plate 54 is positioned as described, the indicating pointer 100 is rotated manually to rotate the shaft 92 and thermostat 50 will pick up and rotate the shaft of the fixture against the pressure of the master thermostat, moving the indicating pointer of the fixture past its associated scale as the shaft 92 is rotated. When such pointer reaches the zero mark of the fixture scale, the setting of the thermostat 50 will be the same as that of the master thermostat and the position of the pointer 100 is then marked on the plate 54 with a suitable tool. If the pointer is locked in the position marked as described, the thermostat 50 has the standard setting for some selected temperature, for example, 75°. By modifying the master thermostat, the standard settings of the thermostat 50 at other temperatures may be indicated on plate 54.

After the standard setting of the thermostat has been marked on said plate, the plate with the shaft 92 and pointer 100 thereon is assembled in proper position on the carburetor and if it be desired that the thermostat have the standard setting, the pointer 100 is positioned in alignment with the mark which was made on plate 54, the arm 84 is positioned on the reduced portion 90 of the shaft 92, the throttle is moved to closed position and while the parts are held in the positions described, the clamping screw 106 is tightened up so as to hold the parts fixed in such positions.

If a thermostat setting different from the standard setting is desired, the pointer 100 is first moved to alignment with the mark made as described on plate 54, the throttle is moved to closed position and the pointer moved away from said mark to the desired extent, clockwise if a leaner setting is desired, counterclockwise for a richer setting.

If it be desired to readjust the setting of the thermostat after the device is assembled and all of the parts clamped in adjusted position, all that it is necessary to do is to loosen the clamping screw 106, so that the arm 84 can be moved without moving the shaft 92, move the throttle to closed position and then move the pointer 100 either clockwise or counterclockwise to the desired position relative to the index mark which denotes the standard setting of the thermostat. When the pointer 100 has been moved to the desired position and while the throttle is held in its closed position, the clamping screw 106 is tightened to lock the parts in the readjusted position.

As already indicated, the particular construction of the fixture by means of which the setting of the thermostat is compared with that of a master thermostat to enable a standard setting of the thermostat at some selected temperature to be marked on the plate 54 is no part of this invention. Any suitable apparatus in which an indicator associated with a master thermostat can be moved past a suitable scale against the pressure of said master thermostat, by rotation of the indicator connected to the thermostat, the setting of which is to be indexed or indicated, can be employed.

In the manner described, any standard setting of the thermostat 50 can be readily indicated on the plate 54 and the thermostat can be easily set in that position or in any desired position at variance with such standard setting when the carburetor is assembled, or the thermostat can be reset subsequently with a minimum of difficulty.

While the embodiment of the present invention as herein disclosed constitutes a preferred form, it is to be understood that other forms might be adopted.

What is claimed is as follows:

1. The method of visibly indicating a standard setting of the choke controlling thermostat in a carburetor which is provided with an automatic choke mechanism in which an operating connection is provided between the choke controlling thermostat and the throttle valve when the carburetor is assembled, so that movements of the throttle valve effect movements of the thermostat and variations in the pressure exerted thereby on the choke valve, and in which an indicator is connected to the thermostat and movable over an indicating dial by which the thermostat and indicator are rotatably supported; which includes the steps of holding the indicating dial against rotation connecting the thermostat so as to move a second indicator against the pressure exerted by a master thermostat, rotating the first indicator and the thermostat so as to move the second indicator until said second indicator reaches a predetermined position, while maintaining both thermostats at a predetermined temperature, indexing the position of the first indicator on the indicating dial when the second indicator reaches said predetermined position, whereby the indexed position of the first indicator designates a standard of the thermostat.

2. The method of indicating a standard setting of the choke controlling thermostat, and setting of said thermostat in the indicated position, in a carburetor which is provided with an automatic choke mechanism in which an operating connection is provided between the choke controlling thermostat and the throttle valve when the carburetor is assembled, so that movements of the throttle valve effect movements of the thermostat and variations in the pressure exerted thereby on the choke valve, and in which an indicator is connected to the thermostat and movable over an indicating dial, by which the thermostat and indicator are rotatably supported; which includes the steps of holding the indicating dial against rotation connecting the thermostat so as to move a second indicator against the pressure exerted by a master thermostat, rotating the first indicator and the thermostat so as to move the second indicator, until said second indicator reaches a predetermined position, while maintaining both thermostats at a predetermined temperature, indexing the position of the first indicator on the indicating dial when the second indicator reaches said predetermined position, so as to designate the standard setting of the thermostat, moving the throttle to its closed position, then moving the first indicator to a position in alignment with the index mark on the dial and while the parts are held in such positions, locking the throttle operated mechanism and the indicator against relative movement.

3. The method of indicating a standard position of the choke controlling thermostat and for initially setting said thermostat in a position at variance with said standard position, in a carburetor which is provided with an automatic choke mechanism in which an operating connection is provided between the choke controlling thermostat and the throttle valve when the carburetor is assembled, so that movements of the throttle valve effect movements of the thermostat and variations in the pressure exerted thereby on the choke valve, and in which an indicator is connected to the thermostat and movable over an indicating dial; by which the thermostat and indicator are rotatably supported; which includes the steps of holding the indicating dial against rotation connecting the thermostat so as to move a second indicator against the pressure exerted by a master thermostat, rotating the first indicator and the thermostat so as to move the second indicator, until said second indicator reaches a predetermined position, while maintaining both thermostats at a predetermined temperature, indexing the position of the first indicator on the indicating dial when the second indicator reaches said predetermined position, so as to designate the standard setting of the thermostat, moving the throttle to its closed position, then moving the first indicator to a position at one side or the other of said index mark while holding the throttle in closed position and while holding the parts in the positions designated, locking the throttle operated connection and the first indicator against movement relative to each other.

4. In a carburetor for internal combustion engines having a mixture passage, fuel and air inlets to supply fuel and air thereto, a throttle for controlling the flow of mixture therefrom, a choke valve for controlling the admission of air thereto, means for automatically controlling the position of said choke valve including a thermostat for holding said valve closed at low temperatures and means operable by engine suction and exerting a force on said valve tending to move said valve toward open position, an operating connection between the throttle and said thermostat which when operative is effective to move the thermostat as the throttle is moved so as to vary the force exerted by the thermostat in accordance with the throttle position, said throttle and said thermostat being independently movable when said operating connection is ineffective so the throttle can be closed and the thermostat moved to a standard initial position where it holds the choke valve closed with no appreciable pressure at any predetermined selected temperature, a stationary indicator plate, an indicating element connected to said thermostat and movable over said plate so as to permit the position of said indicating element when the thermostat is in the previously mentioned position, to be marked on said indicator plate, and means for rendering the operating connection between the throttle and thermostat effective after the standard initial position of the thermostat has been marked on said indicator plate.

5. In a carburetor for internal combustion engines having a mixture passage, fuel and air inlets to supply fuel and air thereto, a throttle for controlling the flow of mixture therefrom, a choke valve for controlling the admission of air thereto, means for automatically controlling the position of said choke valve including a thermostat for holding said valve closed at low temperatures and means operable by engine suction and exerting a force on said valve tending to move said valve toward open position, an operating connection between the throttle and said thermostat whereby movements of the throttle effect movements of the thermostat and variations in the force exerted thereby, means for controlling the effectiveness of the operating connection between the throttle and the thermostat and adjustable to permit the throttle to be moved to closed position independently of the thermostat and to permit the latter, while the throttle remains stationary and at any seleced temperature, to be initially set in a position to hold the choke valve closed without appreciable pressure thereon at the temperature selected, a stationary indicator plate, an indicating element connected to said thermostat and movable relative to said plate as the thermostat is moved so that the position of the indicating element corresponding to the initial setting of the thermostat at any selected temperature can be marked on said plate, said controlling means being manually adjustable in order to render the operating connection between the throttle and thermostat effective after the initial seting of the thermostat has been marked on said plate so that subsequent movements of the throttle will effect movements of the thermostat.

6. In a carburetor for internal combustion engines having a mixture passage, fuel and air inlets to supply fuel and air thereto, a throttle for controlling the flow of mixture therefrom, a choke valve for controlling the admission of air thereto, means for automatically controlling the position of said choke valve including a thermostat for holding said valve closed at low temperatures and means operable by engine suction and exerting a force on said valve tending to move said valve toward open position, an operating connection between the throttle and said thermostat whereby movements of the throttle effect movement of the thermostat and variations in the force exerted thereby, means for controlling the effectiveness of the operating connection between the throttle and the thermostat and adjustable to permit the throttle to be moved to closed position independently of the thermostat and to permit the latter, while the throttle remains stationary and at any selected temperature, to be initially set in a position to hold the choke valve closed without appreciable pressure thereon at the temperature selected, a stationary indicator plate, an indicating element connected to said thermostat and movable relative to said plate as the thermostat is moved so that the position of the indicating element corresponding to the initial setting of the thermostat at any selected temperature can be marked on said plate, said thermostat being movable from its initial setting if desired to modify the mixture ratio from that which would be obtained by said initial setting of the thermostat and said controlling means being manually adjustable, after the thermostat has been set in the desired position, to render the operating connection between the throttle and the thermostat effective so that subsequent movements of the throttle will effect movements of the thermostat.

References Cited in the file of this patent

UNITED STATES PATENTS

| Number | Name | Date |
|---|---|---|
| 2,393,290 | Chandler | Jan. 22, 1946 |
| 2,427,030 | Swigert | Sept. 9, 1947 |
| 2,479,392 | Miller | Aug. 16, 1949 |